(12) United States Patent
Siegmund et al.

(10) Patent No.: US 7,779,981 B2
(45) Date of Patent: Aug. 24, 2010

(54) WELDED CHAIN WHEEL

(75) Inventors: Jochen Siegmund, Hamburg (DE); Christian Vick, Winsen (DE)

(73) Assignee: DOLMAR GmbH, Hamburg (DE)

( * ) Notice: Subject to any disclaimer, the term of this patent is extended or adjusted under 35 U.S.C. 154(b) by 389 days.

(21) Appl. No.: 11/420,272

(22) Filed: May 25, 2006

(65) Prior Publication Data
US 2006/0266613 A1 Nov. 30, 2006

(30) Foreign Application Priority Data
May 27, 2005 (DE) .................. 20 2005 008 460 U

(51) Int. Cl.
*F16D 13/62* (2006.01)

(52) U.S. Cl. .................. 192/107 T; 29/893.1

(58) Field of Classification Search ................ 474/158; 74/432; 29/892.1
See application file for complete search history.

(56) References Cited

U.S. PATENT DOCUMENTS

| 1,143,558 | A | * | 6/1915 | Templeton | .................... 74/432 |
| 2,969,175 | A | * | 1/1961 | Bliss | ............................ 74/432 |
| 3,279,272 | A | * | 10/1966 | Gudmundsen | .............. 474/164 |
| 4,791,269 | A | * | 12/1988 | McLean et al. | ............ 29/893.1 |
| 6,698,078 | B2 | * | 3/2004 | Prucher | ....................... 29/428 |

FOREIGN PATENT DOCUMENTS

| DE | 24 50 387 | | 11/1975 |
| DE | 31 35 203 | A1 | 3/1983 |
| DE | 296 16 652 | U1 | 3/1997 |

* cited by examiner

*Primary Examiner*—Rodney H Bonck
(74) *Attorney, Agent, or Firm*—Kelly Lowry & Kelley, LLP

(57) ABSTRACT

In order to make available a clutch drum, which is connected to a toothed wheel, in particular a toothed wheel designed as a chain wheel for a motor saw, wherein a non-detachable connection of the toothed wheel and clutch drum is associated with a positive connection, and wherein the connection of the clutch drum and toothed wheel is a low cost, durable and reliable connection, it is proposed that the clutch drum is provided with a recess, wherein a rigid connection is provided between the toothed wheel and the clutch drum, which is welded from inside the clutch drum.

15 Claims, 2 Drawing Sheets

WELDED CHAIN WHEEL

This invention relates to a clutch drum that is connected to a toothed wheel, preferably with a toothed wheel designed as a chain wheel for the saw chain of a motor saw.

Clutch drums of the type just mentioned, in which are arranged, inside the drum of bell-shaped design, centrifugal weights which lie against a wall section of the clutch drum running in the axial direction under the influence of the centrifugal force, and after coming to rest on it carry the clutch drum together with the parts to be driven, associated with it, are used in different embodiments, for example in motor saws, lawnmowers or small vehicles as parts of the drive for chains and V-belts.

Fixed and loose connections are known for providing the connection of the clutch drum to a toothed wheel, in particular with a toothed wheel designed as a chain wheel. In the case of loose connections the chain wheel is centered in the clutch drum in a central hole which is provided with toothing. The chain wheel is provided with a counter-profile enabling forces to be transmitted. The clutch drum and chain wheel assembly is held together by an additional locking device. Soldered joints or pulsed arc welded joints are known as fixed connections, where the chain wheels are centered by means of a projection on the chain wheel in the central hole in the clutch drum and soldered with a hard solder. In the case of sintered chain wheels welded bosses are formed which are then welded to the clutch drum by the pulsed arc welding method.

However, such connections suffer from the disadvantage that fixed connections are not always associated with a positive connection that is also low cost and durable.

The task of the invention is therefore to make available a clutch drum with a toothed wheel in which a non-detachable connection between the toothed wheel and clutch drum is associated with a positive connection. Moreover, the connection between the clutch drum and toothed wheel should be a low cost, durable and reliable connection.

This object is achieved by a clutch drum with a positive connection Between the clutch drum and a toothed wheel. Advantageous embodiments and suitable developments of this invention are identified in the subordinate claims.

It is advantageous for the step to be inserted in the tooth profile of the recess.

It is conceivable for the toothing of the clutch drum a toothed wheel to be omitted. Therefore the present invention provides for the toothed wheel to have a centering ring which is inserted in the clutch drum.

The tooth profile of the recess is suitably identical to the tooth profile of the step.

It is advantageous for the fixed connection to be designed as a welded seam, wherein the welded seam may be a laser welded seam. An irreversible connection is produced by the welded seam. Moreover, the admission of heat through the laser welded seam is very low, i.e. the heat only enters at certain points. The welded seam is preferably formed between the root lines of the tooth profile of the recess and the step.

Hardened toothed wheels are desirable, and for this reason provision is made for the toothed wheel to consist of extruded sectional steel or a sinter material.

To provide an approximately positive connection it is advantageous for the step to be designed so that projects approximately 2 mm with the tooth profile, and for the step to have roughly the height of the clutch drum wall thickness.

A method, in particular for transmitting a torque of a drive to a chain, in which a clutch drum is connected to a toothed wheel, in particular a toothed wheel designed as a chain wheel, is the object of the claimed invention, whereby the clutch drum is provided with a recess having a tooth profile, is inserted in the toothed wheel and the clutch drum and toothed wheel are connected irreversibly, preferably welded together.

Here too it is appropriate for the toothed wheel and the clutch drum to be welded together by laser welding.

Exemplary embodiments of the invention are explained in the following with reference to the figures where, in diagrammatic representations, FIG. 1 shows a perspective view of a clutch drum according to the invention;

Figure 1:
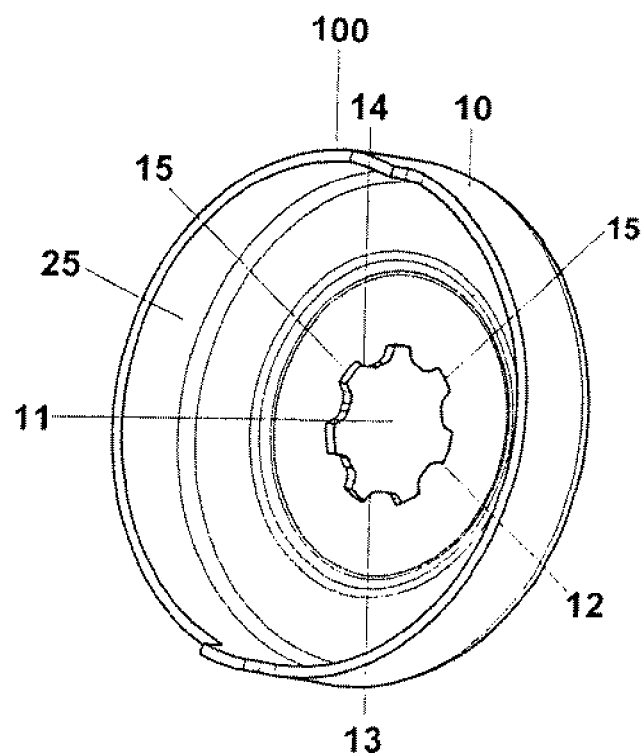

FIG. 1 shows an exemplary embodiment of a clutch drum 100. Clutch drum 100 has a drum-like housing 25 with an internal wall surface 10 and a recess 11 arranged centrally in wall surface 10 in the form of a tooth profile 12. Tooth profile 12 is identified by left flanks 13 and right flanks 14, and root lines 15 arranged alternately to them. A chain wheel, for example for a saw chain of a motor saw, can be permanently arranged in recess 11. Root lines 15 also serve as welded points, access to which is gained from the inside of wall surface 10 of clutch drum 100.

Figure 2:
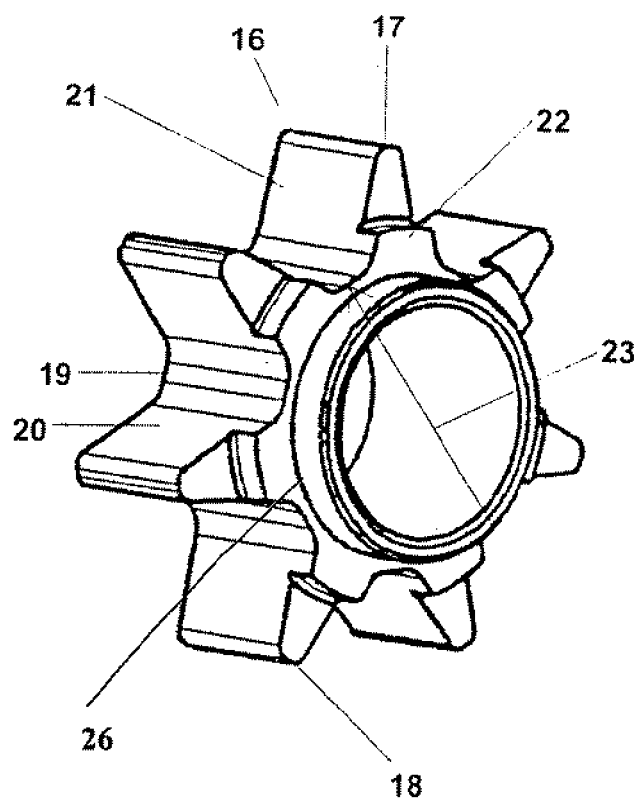
FIG. 2 shows a perspective view of a toothed wheel according to the invention.

A toothed wheel 16 with a tooth profile 17, in whose teeth 18 a saw chain of a motor saw engages, is illustrated in FIG. 2. Tooth profile 17 has toothed pits 19 to which left flanks 20 and right flanks 21 are connected on both sides, together with a centering ring 26. Here toothed wheel 16 may be manufactured from extruded sectional steel, but also of sinter material. A step 22, which is located on the side of toothed wheel 16, which is connected to the clutch drum 100, serves to connect the toothed wheel 16 to clutch drum 100. Here step 22 has roughly the height of the wall thickness of clutch drum 100. Step 22 is designed with tooth profile 17, in particular approximately 2 mm above root circle 23. Clutch drum 100 has in its recess 11 the same tooth profile 12 as step 22 on toothed wheel 16. This guarantees that toothed wheel 16 and clutch drum 100 can be inserted one inside the other.

Figure 3:
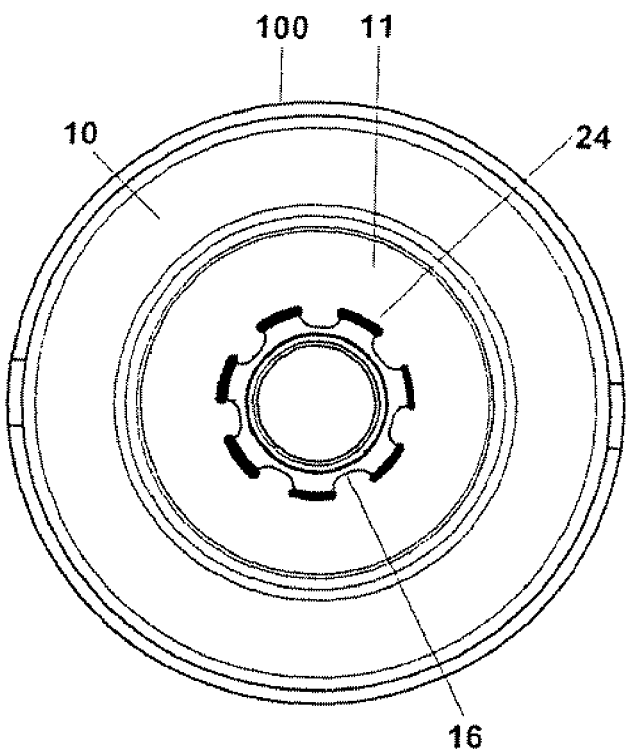
FIG. 3 shows, in elevation, the clutch drum according to FIG. 1, in connection with the toothed wheel from FIG. 2.

FIG. 3 shows that clutch drum 100 and toothed wheel 16 are inserted one inside the other. Toothed wheel 16 is located in recess 11 of wall surface 10 of clutch drum 100, wherein step 22 of toothed wheel 16 is connected by a welded seam 24 to root line 15 of tooth profile 12, which is formed in recess 11 in wall surface 10 of clutch drum 100. In addition to the toothing of clutch drum 100 and toothed wheel 16, i.e. a positive connection made by mutual insertion, the welding is carried out in order to connect clutch drum 100 and toothed wheel 16 irreversibly together. Access to welded points 24, which are located on root lines 15 of tooth profile 12 in recess 11 of clutch drum 100, is gained from the inside of wall surface 10 of clutch drum 100. This guarantees a detachable connection of toothed wheel 15 and clutch drum 100, wherein the motor force is at the same time transmitted to toothed wheel 16 in that toothed wheel 16 and clutch drum 100 are inserted one inside the other. It must be borne in mind, however, that there is no real positive connection because of production tolerances. Welded seams 24 may, in particular, be produced by laser welding.

Figure 4:
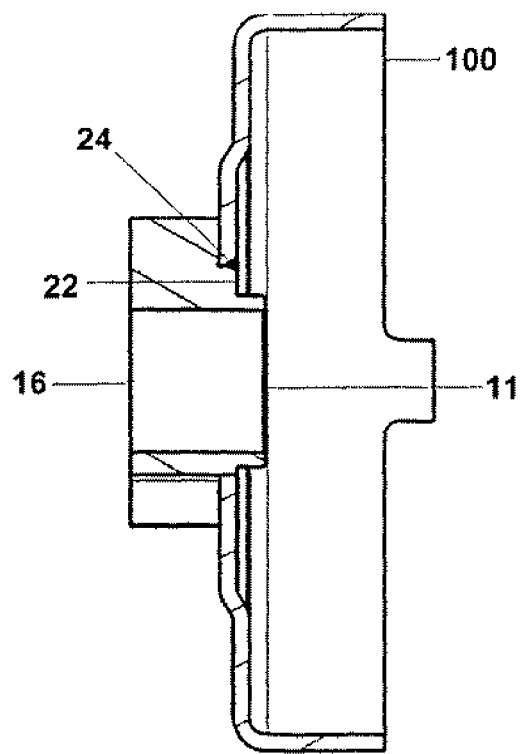
FIG. 4 shows, in longitudinal section, the clutch drum according to FIG. 1 in connection with the toothed wheel from FIG. 2.

FIG. 4 shows once again the connection of toothed wheel 16 and clutch drum 100 in longitudinal section. Here step 22 of toothed wheel 16 is rigidly connected to the tooth profile of recess 11 in wall surface 10 of clutch drum 100, wherein the rigid connection is provided by a welded seam 24. Because clutch drum 100 has in its recess 11 the same tooth profile 12 as step 22, it is possible for toothed wheel 16 and clutch drum 100 to be inserted without difficulty one inside the other, and with welded seam 24, which is provided between root line 15 of recess 11 in clutch drum 100 and teeth 18 of toothed wheel 16, provides both a rigid connection between toothed wheel 16 and clutch drum 100 and optimum transmission of forces to toothed wheel 16, as also shown in FIG. 4.

LIST OF REFERENCES

100 Clutch drum
11 Recess
12 Tooth profile
13 Left flanks
14 Right flanks
15 Root lines
16 Toothed wheel
17 Tooth profile
18 Teeth
19 Toothed pits
20 Left flanks
21 Right flanks
22 Step
23 Root circle
24 Welded seam
25 Drum-like housing
26 Centring ring

The invention claimed is:

1. A clutch drum (100) which is directly connected to a toothed wheel (16), in particular to a toothed wheel designed as a chain wheel for a motor saw, characterised in that the clutch drum (100) is provided with a recess (11) having a tooth profile (12) that is a unitary component of the clutch drum (100) and is not a separate component attached to the clutch drum (100), the toothed wheel (16) has a step (22), on which is formed a toothed wheel profile (17), wherein the toothed wheel profile (17) is inserted in the tooth profile (12) forming a rigid connection between the toothed wheel (16) and the recess (11) of the clutch drum (100), which is welded from inside the clutch drum (100), and wherein the toothed wheel (16) has a centring ring (26), which is inserted in the recess (11) of the clutch drum (100).

2. The clutch drum according to claim 1, characterised in that the rigid connection comprises a peripheral circular laser welded seam between the toothed wheel (16) and the recess (11).

3. The clutch drum according to claim 2, characterised in that the peripheral circular laser welded seam partially spans the rigid connection between the toothed wheel (16) and the recess (11).

4. The clutch drum according to claim 1, characterised in that the tooth profile (12) in recess (11) is identical to the toothed wheel profile (17) of the step (22).

5. The clutch drum according to claim 1, characterised in that the rigid connection is irreversibly formed as a welded seam (24).

6. The clutch drum according to claim 5, characterised in that the welded seam (24) is formed as a laser welded seam.

7. The clutch drum according to claim 5, characterised in that the welded seam is formed between root lines (15) of the tooth profile (12) of the recess (11), and the step (22).

8. The clutch drum according to claim 1, characterised in that the toothed wheel (16) consists of extruded sectional steel.

9. The clutch drum according to claim 1, characterised in that toothed wheel (16) consists of a sinter material.

10. The clutch drum according to claim 1, characterised in that the step (22) projects with the toothed wheel profile (17) about 2 mm from a root circle (23) of the toothed wheel (16).

11. The clutch drum according to claim 10, characterised in that the step (22) has approximately the height of the wall thickness of the clutch drum (100).

12. A method for transmitting a torque of a drive to a saw chain, wherein a clutch drum (100), in conjunction with a toothed wheel (16), is in particular connected to a toothed wheel designed as a chain wheel, comprising the steps of:

providing the clutch drum (100) having a recess (11) with a tooth profile (12) that is a unitary component of the clutch drum (100) and is not a separate component attached to the clutch drum (100);

providing the toothed wheel (16) having a step (22) with a toothed wheel profile (17) and a centring ring (26);

inserting the centring ring (26) and toothed wheel profile (17) in the tooth profile (12) of recess (11) such that the clutch drum (100) is rigidly connected directly to the toothed wheel (16); and welding the clutch drum (100) to the toothed wheel (16).

13. The method of claim 12, wherein the welding step comprises laser welding the clutch drum (100) to the toothed wheel (16).

14. The method of claim 12, wherein the welding step comprises welding root lines (15) of the toothed profile (12) to the step (22) of the toothed wheel (16).

15. The method of claim 14, wherein the welding step is carried out from an inside wall surface (10) of the clutch drum (100).

* * * * *